United States Patent [19]

Phillips

[11] 4,127,010
[45] Nov. 28, 1978

[54] HEAT ACTIVATED HEAT PUMP METHOD AND APPARATUS

[75] Inventor: Benjamin A. Phillips, Benton Harbor, Mich.

[73] Assignee: Allied Chemical Corporation, Morris Township, N.J.

[21] Appl. No.: 796,773

[22] Filed: May 13, 1977

[51] Int. Cl.² .................. F25B 15/00; F25B 37/00; F25B 33/00

[52] U.S. Cl. ................................ 62/101; 62/476; 62/494; 62/495

[58] Field of Search ............. 62/101, 476, 494, 495, 62/496

[56] References Cited

U.S. PATENT DOCUMENTS

| | | | |
|---|---|---|---|
| 2,201,362 | 5/1940 | Bergholm | 62/490 |
| 2,392,894 | 1/1946 | Zwickl | 62/490 |
| 3,461,684 | 8/1969 | Simpson | 62/476 |
| 3,514,970 | 6/1970 | Eisberg | 62/476 |
| 3,527,060 | 9/1970 | Kruggel | 62/476 |
| 3,563,052 | 2/1971 | Brown | 62/476 |

*Primary Examiner*—Lloyd L. King
*Attorney, Agent, or Firm*—Alan M. Doernberg; Jay P. Friedenson

[57] ABSTRACT

In a heat activated heat pump apparatus having a generator, condensor, evaporator and absorber, a first coolant pathway through the absorber and condenser and a second coolant pathway through the evaporator. An ambient air heat exchanger and a second heat exchanger in heat exchange relation with the space to be cooled or heated are selectively interconnected with the first and second coolant pathways. In the improvement, rich liquor from the absorber is preheated by heat exchange with a portion of the interior of the absorber, with the weak liquor from the generator and with the refrigerant vapor from the generator.

19 Claims, 6 Drawing Figures

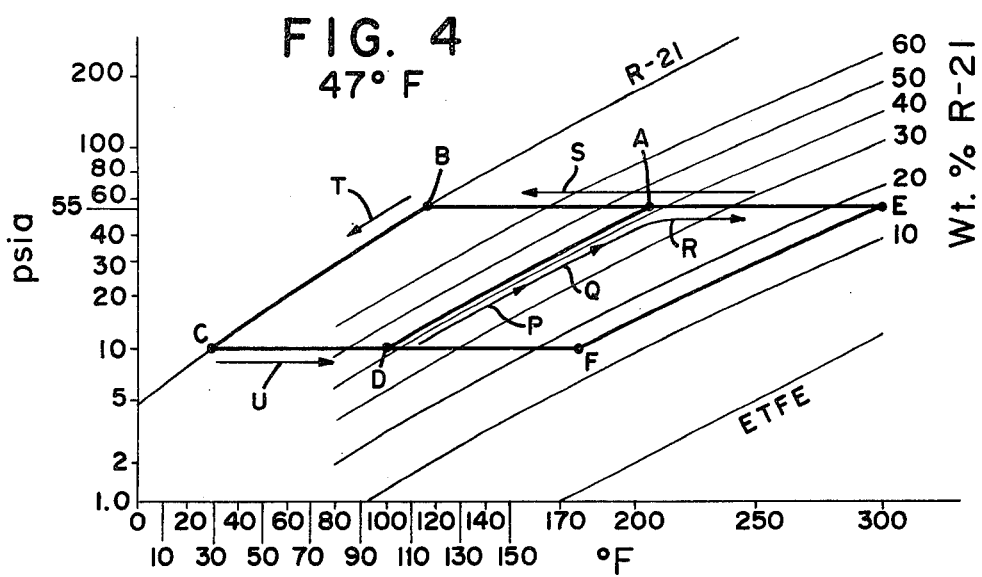
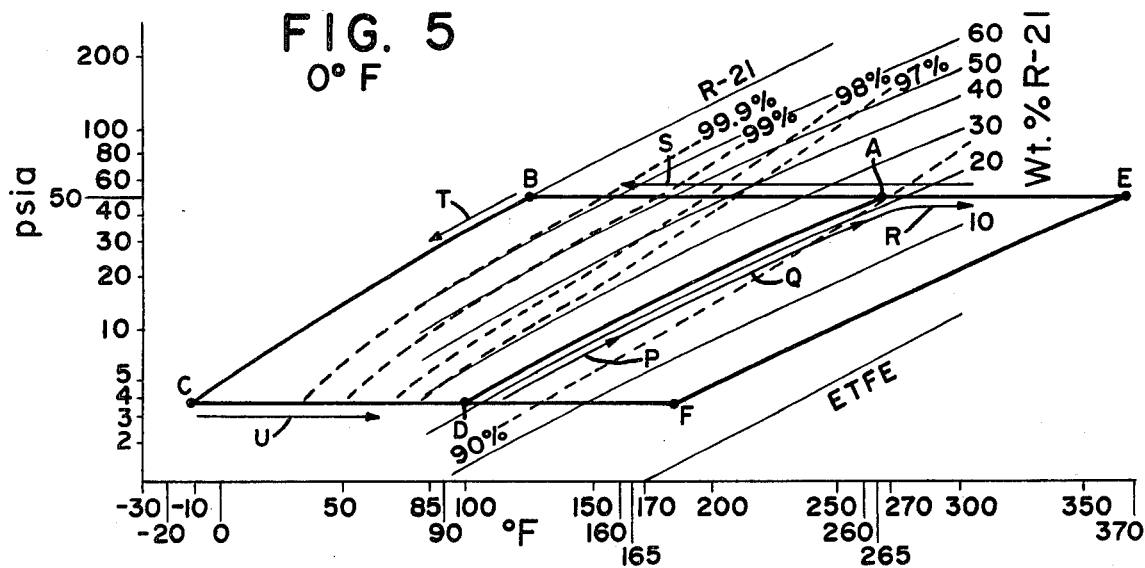
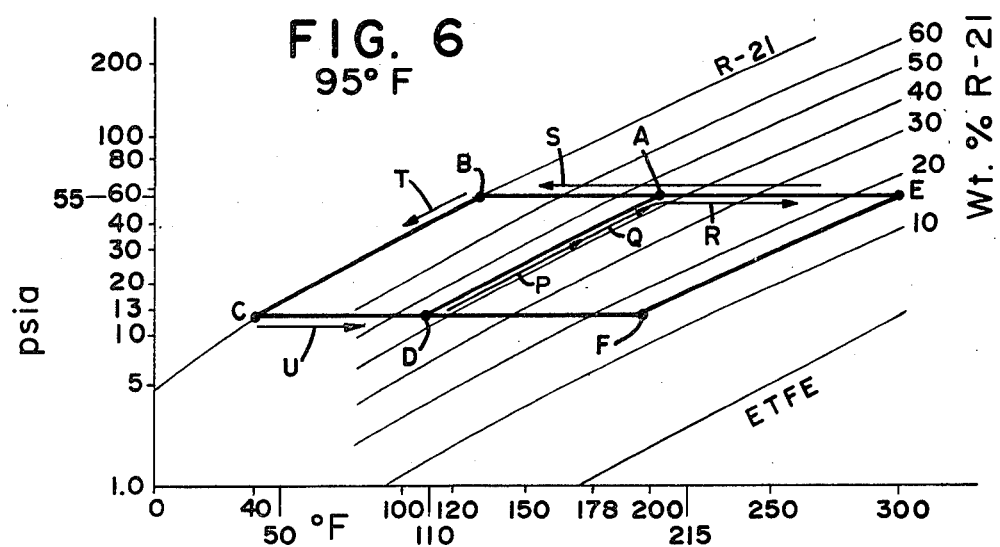

HEAT ACTIVATED HEAT PUMP METHOD AND APPARATUS

CROSS REFERENCES TO RELATED APPLICATIONS

B. A. Phillips, "Analyzer and Rectifier Method and Apparatus for Absorption Heat Pump", Ser. No. 796,631, filed May 13, 1977.

B. A. Phillips, "Method and Generator Unit of an Absorption Heat Pump System for Separating a Rich Liquor into a Refrigerant and a Solution Low in Refrigerant Content," Ser. No. 796,493, filed May 12, 1977.

B. A. Phillips, "Improved Absorption Heat Pump Absorber Unit and Method," Ser. No. 796,084, filed May 12, 1977.

M. B. Berenbaum et al., "Stabilized Heat Activated Heat Exchanger Absorption Pair," Ser. No. 760,489, filed Jan. 19, 1977.

BACKGROUND OF THE INVENTION

An exemplary refrigeration system, designed for cooling only, is disclosed in J. H. Perry, CHEMICAL ENGINEER'S HANDBOOK (4th Edition New York 1963) at pages 12-10 thru 12—12. A generator is provided with an inlet for a rich or strong liquor (absorbent with a high concentration of refrigerant). The rich liquor contains water (the "absorbent" or solvent) and a high concentration of ammonia (the refrigerant or "solute"). The rich liquor is heated and separated into refrigerant vapor and a "weak" liquor or aqua (absorbent with a low concentration of refrigerant). The gaseous ammonia refrigerant passes under pressure to a condenser where it is condensed by heat exchange with a first cold water coil and then flows through an expansion valve. The liquid ammonia is then evaporated in an evaporator in heat exchange relation with a second coil which communicates with a cold storage room or ice tank and contains a circulating coolant such as brine. The evaporated ammonia then passes to an absorber where it mixes with weak liquor from the generator, evolving heat, some of which is removed by a third coil containing circulated water.

In such a system the rich liquor is pumped from the rich liquor outlet of the absorber to the rich liquor inlet of the generator via an enclosure denominated a heat exchanger. Weak liquor from the weak liquor outlet passage of the generator passes through a fourth coil in the heat exchanger to the weak liquor inlet of the absorber. Heat is transferred only from the weak liquor to the strong liquor, out of the coolant in the second coil and into the coolants of the first and third coils. In the refrigeration system described, the heat taken into the first and third coils is rejected to "waste" or the atmosphere.

Other heat activated, absorption refrigeration systems as well as some heat pumps are disclosed in U.S. Pat. Nos. 2,193,535 (Mar. 12, 1940 to Maiuri), 2,201,362 (May 21, 1940 to Bergholm), 2,392,894 (Jan. 15, 1946 to Zwickl), 3,236,064 (Feb. 22, 1966 to Whitlow), 3,270,523 (Sept. 6, 1966 to McNeely), 3,509,732 (May 5, 1970 to Roeder, Jr.), 3,516,264 (June 23, 1970 to Stierlin), 3,527,060 (Sept. 8, 1970 to Kruggel), 3,638,452 (Feb. 1, 1972 to Kruggel).

Although absorption systems have been proposed for many years, it is not believed that any have been successfully commercialized with the capability of operating in the heating mode. Many have failed to maintain the high temperature differentials in the system, and thus the high concentration differentials between rich and weak liquor desirable for efficient operation. This inadequate efficiency and capacity is most noticeable at cold ambient air conditions below 32° F. (0° C.), but has some effect as well under milder heating conditions or under air conditioning conditions.

BRIEF DESCRIPTION OF THE INVENTION

In a heat activated heat pump apparatus having such a generator, a condensor, an evaporator, an absorber, a first coolant pathway through the absorber and condenser, a second coolant pathway through the evaporator, a weak liquor pathway from the generator to the absorber and a rich liquor pathway from the absorber to the generator; the improvement which comprises the rich liquor being located in heat exchange relationship with a portion of the interior of the absorber, with the weak liquor pathway and with the refrigerant pathway.

The invention also includes an improvement in an absorption heating or cooling method of the type wherein rich liquor containing a high concentration of refrigerant in absorbent is heated and separated into refrigerant vapor and a weak liquor containing a low concentration of refrigerant in absorbent, the refrigerant is condensed, the condensed refrigerant is evaporated and the evaporated refrigerant is absorbed in an absorption zone into a weak liquor to form rich liquor; the improvement comprising preheating the rich liquor by heat exchange with the absorption zone, with refrigerant vapor and with weak liquor.

BRIEF DESCRIPTION OF THE DRAWING

FIG. 4 is a temperature-pressure graph illustrating the method of the present invention in the heating mode at 47° F. ambient temperature;

FIG. 5 is a temperature-pressure graph illustrating the method of the present invention in the heating mode at 0° F. ambient temperature;

FIG. 6 is a temperature-pressure graph illustrating the method of the present invention in the cooling mode at 95° F. ambient temperature.

DETAILED DESCRIPTION OF THE INVENTION

Figure 1:
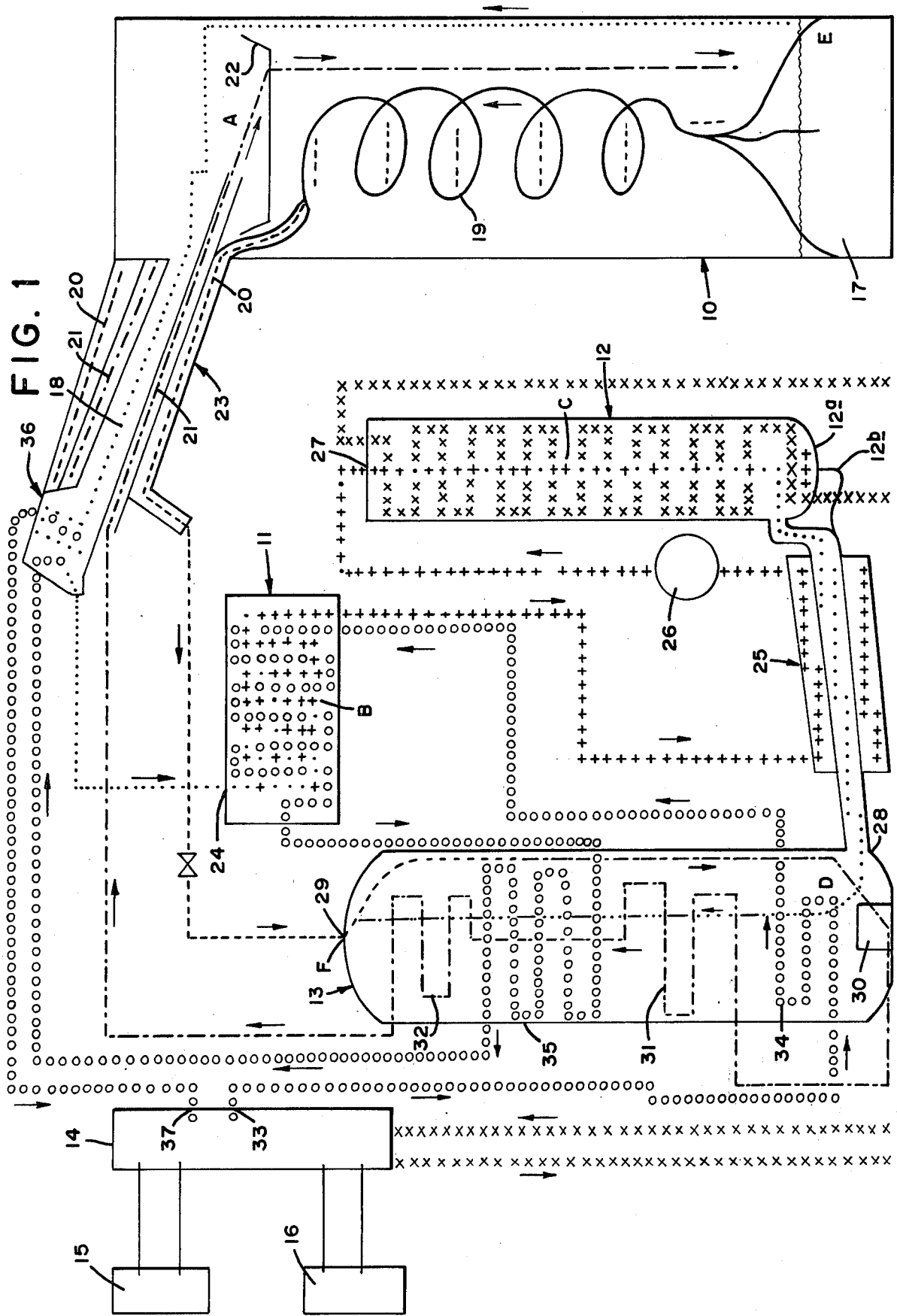
FIG. 1 is a schematic of a heat pump according to a first embodiment of the invention.

The invention includes an improved absorption heat pump apparatus wherein the rich liquor pathway is located in heat exchange relation with a portion of the interior of the absorber, with the weak liquor pathway from the generator to the absorber and with the refrigerant pathway from the generator to the condenser. Especially suitable absorbers are disclosed in my co-pending application entitled "Improved Absorption Heat Pump Absorber Unit and Method" Ser. No. 796,084. By "pathway" is meant a conduit generally designed for the named fluid which may have insulated or uninsulated portions or both.

It should be appreciated that such an apparatus is usable in the improved method of the invention including preheating the rich liquor by heat exchange with the evaporated refrigerant being absorbed in weak liquor, with refrigerant vapor and with weak liquor. It will be appreciated that the refrigerant vapor and weak liquor are hot coming out of the generator and the absorbing mixture is hot because of the heat of absorption. It will also be appreciated that the preheated rich liquor will thereby require less heat from the boiler or lower portion of the generator supplied by a gas flame or the like. In many preferred forms, the heat exchange between the rich liquor and the absorbing fluids in the interior of the absorber occurs across one or more rich liquor coils inside the absorber. Exemplary structures are shown in my application "Improved Absorption Heat Pump Absorber Unit", Ser. No. 796,084.

However, many other structures are also suitable for the present invention. The heat exchange between the rich liquor and, individually, the weak liquor and the refrigerant vapor, may occur in one or two separate heat exchanger units or otherwise, as for example in the rectifier and heat exchange section disclosed in U.S. Pat. No. 3,270,523. This proximity of refrigerant vapor pathway, weak liquor pathway and rich liquor pathway will be referred to herein as a "triple X" heat exchanger. Such heat exchangers are known in the art, as for example in the disclosure of U.S. Pat. No. 3,270,522 (Sept. 6, 1966 to McNeely). In such a heat exchanger, rich liquor withdraws heat from both the weak liquor and the refrigerant vapor coming out of the generator.

The refrigerant vapor in the analyzer contains absorbent vapor resulting in it being saturated at that pressure and temperature and having a higher enthalpy than that of the pure refrigerant. The heat of condensation of absorbent plus refrigerant condensing with it and the temperature reduction of refrigerant vapor will collectively be referred to as "excess heat."

This enables much of the "excess heat" of the refrigerant vapor above its condensation temperature at the high pressure to be used to preheat incoming rich liquor. It also enables the excess temperature of the weak liquor, required for good separation in the boiler portion of the generator, to be used. With a "triple-X" heat exchanger, neither the weak liquor nor the refrigerant vapor is permitted to lose heat to the atmosphere at the high, boiler temperature because of insufficient insulation of various conduits. Less heat loss could occur at the lower temperatures beyond the "triple-X" heat exchanger.

The preferred apparatus also includes an "outdoor" or ambient air heat exchanger, a second "indoor" heat exchanger in the vicinity of an area to be heated or cooled and means for selectively interconnecting the first and second coolant pathways with the ambient air heat exchanger and second heat exchanger. By "in the vicinty of the area to be heated or cooled" is meant either in the room or other space, or in a duct work system communicating with the space to be cooled, or in any other heat exchange relation with the room or other space. For example, in a residential heat pump, the entire unit is normally located outside the house except for a coolant pathway, normally water or brine, from the unit to the second heat exchanger in the basement (or attic or closet). In the basement a blower selectively passes air in heat exchange with the second heat exchange and into the rooms. By "ambient heat exchanger" is meant a coil or other device that is in direct or indirect heat exchange relation with the atmosphere or other heat sink.

The means for selectively interconnecting can include an eight-way valve (or group of valves) that connects, in the cooling mode, the outlet of first coolant pathway from the absorber and condenser to an inlet to the ambient air heat exchanger and the inlet to the first coolant pathway to an outlet from the ambient air heat exchanger. Simultaneously, in the cooling mode, the outlet of the second coolant pathway from the evaporator is connected to an inlet to the second or basement heat exchanger while the inlet to the second coolant pathway is connected to an outlet from the second or basement heat exchanger. This arrangement permits the ambient air heat exchanger to reject heat from the heat pump into the atmosphere while the second or basement heat exchanger withdraws heat from the house.

In the heating mode, the eight-way valve (or group of valves) connects the inlet and outlet of the first coolant pathway to the outlet and inlet, respectively, of the second or basement heat exchanger. This permits the system to force heat into the house. Simultaneously, the eight-way valve connects the inlet and outlet of the second coolant pathway to the outlet and inlet, respectively, of the ambient air heat exchanger. This permits the system to withdraw heat from the atmosphere.

In preferred forms of the invention, the absorber has a first end which is hot in operation, a weak liquor inlet adjacent the first end, a second end which is warm in operation, a rich liquor outlet adjacent the second end and an evaporated refrigerant inlet adjacent the second end. The first and second ends are sometimes referred to herein as the hot and warm ends respectively. The inlets and outlet establish a concentration gradient of the mixture and also a temperature gradient from a warm temperature at the second or warm end to a hot temperature at the first or hot end. The rich liquor pathway includes a first pathway portion in heat exchange relation with the interior of the absorber. This basic system is illustrated by the embodiment shown in FIG. 2. It should be noted that the term "rich liquor outlet" does not require that rich liquor pass outside the absorber walls, but only that it be removed from the absorption zone.

Figure 3:
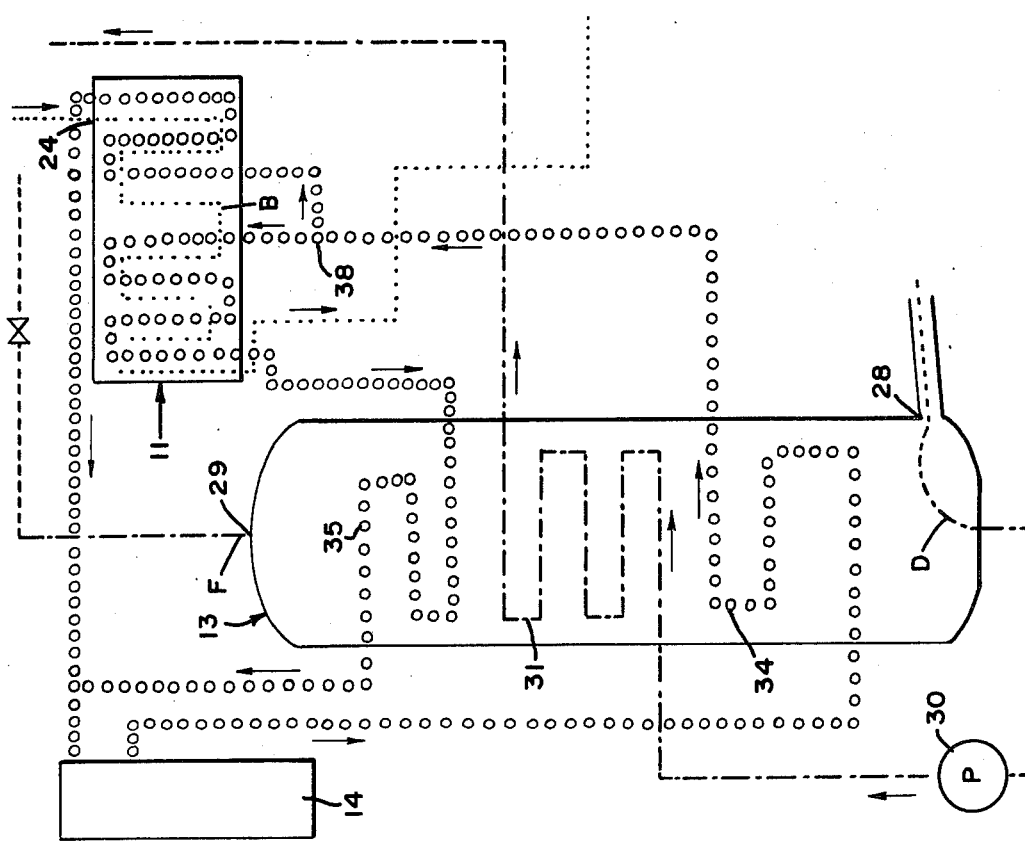
FIG. 3 is a partial schematic of a heat pump according to a third embodiment of the invention.

In some preferred forms with such an absorber and rich liquor pathway, the first coolant pathway includes a second pathway portion in heat exchange relation with the interior of the absorber adjacent the second or warm end and a third pathway portion in heat exchange relation with the interior of the absorber between the first pathway portion and the first or hot end. It is preferred that the first pathway portion be between the second and third pathway portions within the absorber. These embodiments are illustrated in FIGS. 1 and 3 wherein, in operation, the coolant is heated first by the absorbing mixture at a first warm temperature, then by the condensing refrigerant vapor and then by the absorbing mixture at a second, hot temperature. The rich liquor is preheated by the absorbing mixture at a third, warm temperature between the first, warm and second, hot temperatures.

A first preferred form of the system outlined in the previous two paragraphs is one in which the rich liquor pathway includes the first pathway portion and a fourth pathway portion in heat exchange relation with the interior of the absorber and between the third pathway portion and the first or hot end. Thus, the rich liquor is further preheated by the absorbing mixture at a fourth, hottest temperature. This preferred form is illustrated by the embodiment shown in FIG. 1.

A second preferred form of system outlined in the next previous paragraphs is one in which the condenser has a first or hot portion (adjacent the refrigerant vapor inlet) and a second or warm portion. The first coolant pathway includes a branch point between the second pathway portion and the condenser which communicates with a first branch pathway through and in heat exchange relation with the second or warm portion of the condenser and which communicates with the third pathway portion, and a second branch pathway through and in heat exchange with the first or hot portion of the condenser. This preferred form is illustrated by the embodiment shown in FIG. 3.

In many preferred forms of the invention, the first coolant pathway includes a reflux condenser coil in heat exchange relation with the refrigerant pathway from the generator to the condenser. It is desirable to combine the reflux condenser coil (sometimes referred to herein as the refluxer or reflux coil) with one of the above preferred forms of the first coolant pathway, pathway portions and rich liquor pathway, with the reflux coil connected to the third pathway portion. Such a system is illustrated in FIG. 1. If the branched first coolant pathway is used, as in the system shown in FIG. 3, then the reflux coil can be connected to the third pathway portion only or can be connected to the second pathway branch as well. Around the reflux coil, the refrigerant vapor is passed in heat exchange relation with the coolant to further heat the coolant and reflux the refrigerant vapor so as to remove absorbent vapor.

In many preferred forms of the invention, the apparatus further includes a condensed refrigerant path from the condensor to the evaporator and an evaporated refrigerant path from the evaporator to the absorber. A precooler is provided wherein a portion of the condensed refrigerant path is in heat exchange relation with a portion of the evaporated refrigerant path. This enables the condensed refrigerant to reject heat to the evaporated refrigerant. In preferred forms of systems with a precooler, the condensed refrigerant path includes an expansion means for separating an upstream high pressure portion of the condensed refrigerant path adjacent the condenser and a downstream low pressure portion of the refrigerant path adjacent the evaporator and for controllably permitting refrigerant to pass from the upstream portion of the condensed refrigerant path to the downstream portion. Exemplary expansion means include an expansion valve, an orifice or a capillary. It is preferred that the precooler include part of the upstream portion of condensed refrigerant path so that condensed refrigerant at high pressure, before expansion cooling, is cooled in the precooler.

DESCRIPTION OF THE PREFERRED EMBODIMENTS

Referring first to FIG. 1, a first embodiment of the heat pump apparatus is shown suitable for practicing many of the embodiments of the method of the invention. The system includes a generator 10, a condenser 11, an evaporator 12, an absorber 13, an eight-way valve 14 (or a valve combination having the same function) a first or ambient air heat exchanger 15 and a second heat exchanger 16. Preferred forms of many of these components are described in my other copending applications referenced above. Nonetheless, the following description should make clear the construction and operation of the heat pump system.

The generator 10 includes a lower, boiler section wherein a liquid 17, illustrated by a mixture of dots and dashes, is heated so as to boil off a refrigerant vapor shown by dots. The liquid at 17 is in some preferred forms partially depleted of refrigerant and may be intermediate between rich and weak liquor; however, as drawn (as a pool boiler) the liquid 17 would be the weakest liquid. In the drawing, rich liquor is shown by alternating dots and dashes, weak liquor by dashes, refrigerant vapor by dots and solutions weaker than rich liquor by more dashes than dots. The exact composition of the rich liquor will vary depending upon the particular refrigerant used, the particular absorbent used, the ambient temperature and other parameters of the system. For illustrative purposes, the rich liquor could be 40–45% refrigerant 21, $CHCl_2F$, by weight and 55–60% absorbent ethyl tetrahydrofurfuryl ether (ETFE) also by weight. Refrigerant boils off and rises to the refrigerant outlet passage 18 at the top of the generator 10. The rich liquor is gradually depleted as it falls downward toward 17 as shown by the mixture of dots and dashes until it has achieved at the maximum temperature at point E. Packed analyzer coils, as described in application Ser. No. 796,631. aid in approaching a saturated condition of rich liquor and refrigerant vapor. At point E the liquid has a concentration of about 14–20 weight percent refrigerant 21 and 80–86 weight % ETFE, characteristic of the weak liquor, illustrated by dashes. The pool 17 may contain solution of 20–30% (with the preferred boiler) or 14–17% weak solution (with a pool boiler as shown in FIG. 1). Although a pot boiler at the bottom of the generator 10 may be used, it is preferred to use the pump tube system described in my copending application Ser. No. 796,493.

The weak liquor is propelled upward through analyzer coils 19 in the middle of analyzer section of the generator to the weak liquor outlet passage 20. I describe preferred forms of this analyzer portion in my copending application, Ser. No. 796,631. The rich liquor enters the generator through a rich liquor inlet passage 21 and is spread at point A over the analyzer coils 19 by a distributor 22.

The rich liquor inlet passage 21, weak liquor outlet passage 20 and refrigerant outlet passage 18 together form a "triple-X" heat exchanger 23 wherein the rich liquor is preheated by both the weak liquor and refrigerant vapor. While the construction of this heat exchanger 23 is not critical to the present invention some preferred forms are disclosed in my copending application Ser. No. 796,631.

The refrigerant vapor, shown as dots passes through an insulated conduit from reflux condenser 36 to the refrigerant inlet 24 of the condenser 11. It passes in a tortuous path through the condenser during which it gradually condenses to form the condensed refrigerant liquid illustrated as +'s. Usually, the refrigerant vapor will include absorbent vapor so that its saturation temperature will be at a temperature above the boiling point of the pure refrigerant at the elevated pressure in the condenser when passing through the refrigerant inlet 24. Thus some temperature reduction will occur along with condensation, but by point B the boiling point of essentially pure refrigerant will be achieved.

The condensed refrigerant then passes, through insulated conduits, to the precooler 25 discussed below, through an expansion valve 26 (or capillary or other flow restrictor) and to the condensed refrigerant inlet 27 of the evaporator 12. The refrigerant beyond the inlet 27 is illustrated by point C whereat it has cooled to the minimum temperature of the system and is being evaporated in the evaporator 12 to form the evaporated refrigerant vapor again illustrated as dots. The bottom of evaporator 12 forms a cup 12a where any unevaporated refrigerant may collect (as occurs in the heating mode at low ambient air conditions). A drain conduit 12b permits this liquid to drain into the precooler 25. The refrigerant vapor passes through the precooler 25, where it cools the condensed refrigerant by heat exchange, and into the absorber 13 through the evaporated refrigerant inlet 28.

Weak liquor, shown by dashes, passes through another insulated conduit from the weak liquor outlet passage 20 of the generator 10 to the weak liquor inlet 29 of the absorber 13. Along this path the pressure is reduced by a restrictor which may be a capillary or orifice or an automatic flow control or their equivalent. Point F represents the low pressure point at the end of this conduit. In the absorber 13 the weak liquor is contacted by evaporated refrigerant, the refrigerant absorbing at essentially constant pressure, establishing a temperature and concentration gradient from a first or hot end adjacent the weak liquor inlet 29 to a second or warm end adjacent the evaporated refrigerant inlet 28. The rich liquor at point D near the evaporated refrigerant inlet 28 will contain the high 40–45 weight % refrigerant 21. For illustrative purposes, it can be assumed that the temperature gradient in the absorber 13 follows generally the boiling temperatures of the changing concentration of refrigerant 21 in ETFE and ranges from about 105° F. at the warm end to about 175° F. at the first or hot end, corresponding to a concentration gradient of 40–45% refrigerant 21 at the second or warm end to 14–20% refrigerant 21 at the hot end. The rich liquor is pumped by a solution pump 30 up to the higher pressure of the generator 13 and toward the generator 13. According to the present invention, the rich liquor passes through the absorber 13 in one or more heat exchange coils, or other heat exchange devices denominated "pathway portions", such a first pathway or coil 31 being illustrated at an intermediate area or first portion along the temperature gradient of the absorber 13. It then may flow through a fourth pathway or coil 32 at an area or fourth portion of the absorber 13 which is next to the weak liquor inlet 29 and thus at the hottest portion of the absorber 13. In the first pathway or coil 31 and fourth pathway or coil 32, both a part of the rich liquor pathway, the rich liquor is preheated to about 140°–150° F. In the triple-X heat exchanger 23, it is further heated to about 190°–200° F. Thus, the analyzer and boiler portion of the generator 10 need only heat the rich refrigerant from about 190°–200° F. to about 300° F. to generate refrigerant and weak liquor, instead of having to raise it from about 105° F. as found at point D. This improves the efficiency of the heat pump by requiring less external heating above that required without the triple-X heat exchanger 23 or without the absorption heat exchange of the coils 31 and 32 or without both.

The system of FIG. 1 also includes a first coolant pathway shown as circles through the absorber 13 and condenser 11. The first coolant pathway goes from its inlet 33 or the eight-way valve 14, through insulated conduits to a second pathway portion or heat exchange coil 34 in the warm portion of the absorber, through insulated conduits, through the condenser 11 in countercurrent flow to the refrigerant and back through the third pathway portion or coil 35 in a hot portion of the absorber 13. Although water or other coolant would be sufficiently hot after the third coil 35 to provide heating, it is preferred to conduct it next through insulated conduits through a reflux coil 36 in the refrigerant outlet 18 of the generator 10. This provides some additional heating and also partially condenses the refrigerant vapor stream to further remove absorbent vapor and to provide reflux liquid to the rectifier. This reflux coil 36 may be in an extension of exchanger 23 or in a separate enclosure having connections to exchanger 23 for refrigerant vapor flow and reverse flow of condensate. The coolant is then conducted in insulated conduits to the first coolant pathway outlet 37 on the eight-way valve 14.

A representative example of operation of the system at an ambient temperature of 47° F. can be seen by reference to FIGS. 1 and 4. The letters A–F in FIG. 4 represent conditions at the corresponding identified locations in FIG. 1. The coolant in the first pathway enters the inlet 33 at about 95° F. and is heated in the second coil 34 in the absorber to about 106° F. It is heated in the condenser from about 106° to about 122° F. with much of the condensation of refrigerant occurring at about 118° F. In the third coil 35 in the absorber, the coolant is heated to about 135° F. and in the reflux coil 36 at the refrigerant outlet to the generator 10 to about 136° F. Since at an ambient air temperature of about 47° F. heating will be desired, the eight-way valve will be set to its heating mode position to circulate the water from this first coolant pathway into the home to an inside or second heat exchanger 16 where it heats up air in the house ductwork. In the inside heat exchanger 16, the coolant will cool to about 95° F. where it will return to the eight-way valve. It will be appreciated that a water or coolant pump to circulate coolant in the first coolant pathway and through the house may be placed at a variety of locations.

It shall be appreciated that the temperature at the several points along the first coolant pathway can be modified by changing the size and location of the second and third pathway portions or coils 34 and 35 in the absorber 13. In preferred embodiments, these parameters are adjusted according to the ratio of the heat of condensation for the particular refrigerant chosen to the heat of absorption for the particularly absorption pair chosen and the specific heats of the rich liquor and coolant chosen. Those quantities may be determined by thermodynamic studies. For ETFE R-21, about 40% of the theoretically available heat is from condensation and about 58–60% from absorption (the remainder being from the reflux coil 36). Thus the coils 34 and 35 are adjusted so that about 40% of the temperature rise in the first coolant pathway can occur in the condenser 11.

A second coolant pathway, illustrated with x's passes from the eight-way valve, through an insulated conduit to the evaporator 12, through the evaporator and back through insulated conduits to the eight-way valve. In the heating mode, this second coolant pathway will be connected by the eight-way valve to the ambient air heat exchanger 15. This coolant at slightly below the ambient air temperature of 47° F. will be conducted to the evaporator 12 where the refrigerant is evaporating at a pressure of about 10 psia, and thus a temperature of about 30° F. The coolant will cool to near 30° F. releasing heat into the system and then return to the ambient air heat exchanger 15 where it will withdraw more heat from the atmosphere.

In order for the system to operate in the cooling mode, the eight-way valve reverses the connections as described above such that coolant from the ambient air heat exchanger 15 at an ambient temperature of about 95° F. passes along the first coolant pathway. This mode is illustrated in FIG. 6 where points A-F represent the conditions at the correspondingly identified points in FIG. 1. At the second coil 34, the first coolant pathway is heated from about 105° F. to about 112° F. In the condenser, it is heated to about 124° F. with condensation occurring generally at about 120° F. The first coolant pathway is heated in the third heat exchanger 35 to about 135° F. and by the reflux coil 36 to about 136° F. In the ambient air heat exchanger 15, it rejects the heat taken from the absorber, condenser and reflux coil to the atmosphere and returns to about 95°–100° F. This cycle is illustrated in FIG. 6 which differs only slightly from FIG. 4 in that the low pressure is about 12 psia instead of 10 psia.

FIG. 5 illustrates the operation of the system at about 0° F. ambient temperature wherein the high pressure is lowered to about 50 psia and the low pressure to about 3.8 psia. This occurs because cold water returning from outside coil 15 to evaporator 12 is so cold that some refrigerant remains unevaporated and collects in the cup 12a faster than it drains through drain conduit 12b. This withholding of refrigerant from the absorber 13 causes the rich liquor returning to the generator 10 to be weaker, causing in turn the other pressure and temperature changes from FIG. 4 to FIG. 5. Again points A–F represent conditions at the correspondingly identified points in FIG. 1. It can be seen from FIG. 5 that condensation occurs at about 110° F. and evaporation at about −10° F. Thus, coolant in the first coolant pathway will come from the indoor heat exchanger 16 at about 90° F. and be heated in the second coil 34 to about 102° F., in the condenser to about 116° F., in the third coil 35 to about 125° F. and in the reflux coil 36 to about 126° F. It then passes back to the inside heat exchanger 16 to heat the house. Coolant in the second coolant pathway will enter the system at near 0° F., the ambient temperature, and go through the evaporator where refrigerant is evaporating at about −10° F. It travels back to the ambient air heat exchanger 15 where it withdraws heat from the atmosphere. The advantages of the present invention are most apparent at these extreme operation conditions.

Note that for operation at 0° F. ambient temperature, it is necessary that the coolant in the second pathway does not freeze and that the rich liquor at the maximum temperature of about 350° F. does not decompose over time. For this purpose, suitable antifreezes such as ethylene glycol are added to the coolant and certain stabilizers are added to the absorption pair of refrigerant and absorbent. Particularly suitable stabilized absorbtion pairs are disclosed in the copending application of M. B. Berenbaum et al. entitled "Stabilized Heat Activated Heat Pump Absorption Pair", Ser. No. 760,489, filed Jan. 19, 1977.

In FIGS. 4, 5 and 6, the point A-F represent the temperature and pressure of the fluid at that point in FIG. 1, as well as its composition where possible. In FIGS. 4, 5 and 6 the arrow labeled P represent the preheating of the rich liquor in the absorber 13 and the arrow labeled Q represents the preheating of rich liquor in the triple-X heat exchanger 23. The arrow labeled R represents the distillation and/or heating of the rich liquor in the analyzer portion 19. The arrow labeled S represents the rectification and purification of the refrigerant in the analyzer 19, triple-X heat exchanger 23 and reflux coil 36. The arrow labeled T represents the cooling of the condensed refrigerant in the precooler 25, and the arrow U the preheating of the evaporated refrigerant in the precooler 25. Each of these arrows P through U represent an improvement in the efficiency of the heat pump system and/or a direct conservation of fuel.

It is most preferred that the rich liquor be preheated in a series of steps under continuous steady state conditions. The absorbent solution reaches a low temperature point (at the bottom of absorber 13 in one preferred embodiment) which determines the high refrigerant content of the rich liquor. It is then pumped, so as to increase the pressure, and heated, without mass exchange, by the absorbing solution (in absorber 13) and by the counterflowing refrigerant vapor and weak liquor (in rectifier 23). The rich liquor is then passed in heat and mass exchange with the refrigerant vapor and in heat exchange only with the weak liquor (in the analyzer portion of the generator) before collecting in the boiler portion of the generator (in pool 17).

Figure 2:
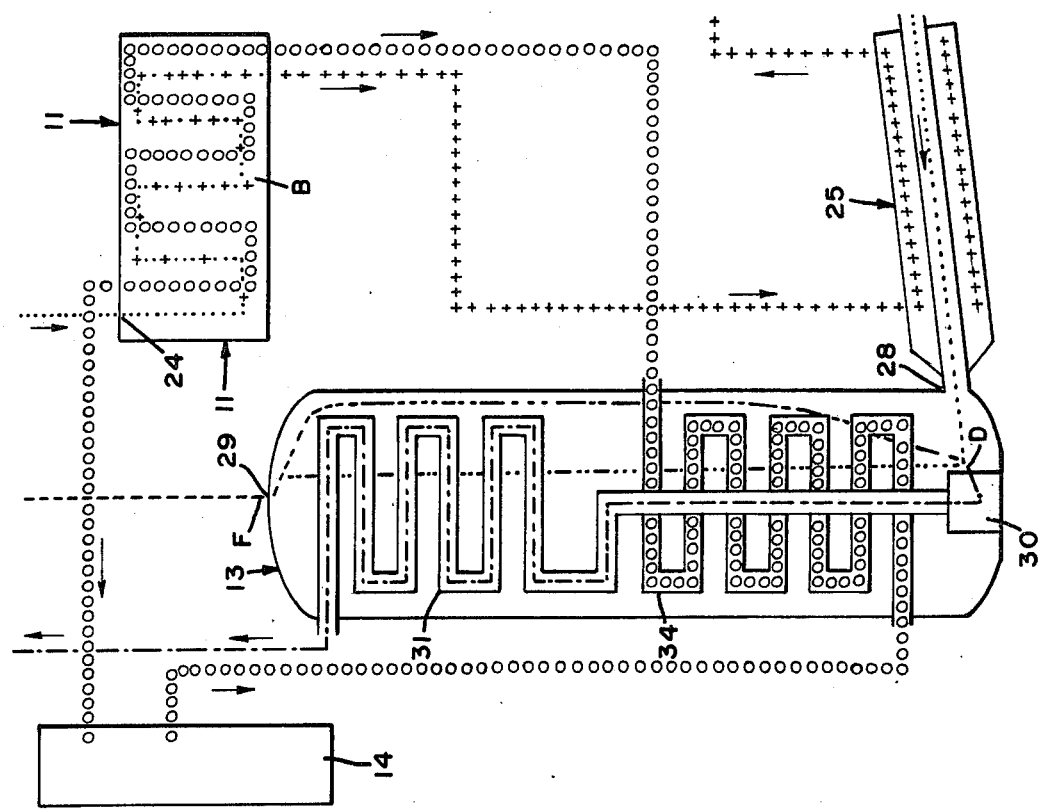
FIG. 2 is a partial schematic of a heat pump according to a second embodiment of the invention.

Referring to FIG. 2, an apparatus according to a second, simpler embodiment of the invention is shown in most respects identical to the embodiment of FIG. 1. The rich liquor pathway from the pump 30 to the first pathway portion or coil 31 is entirely within the absorber 13 permiting the rich liquor to be heated somewhat by the warm portion of the absorber 13. Heat exchange within the first coil 31 heats the rich liquor from about 110° F. to about 140° F. The first coolant path from the eight-way valve 14 passes through the second pathway portion, heat exchanger or coil 34 in the warm portion of the absorber 13. It is heated there to about 120° and is then heated in the condenser to about 130°. While this system provides significantly improved efficiencies over the prior art, it does cause the condenser 11 to operate at a condensing temperature for the majority of the fluid of about 125° F. or higher. If refrigerant 21 is the refrigerant, this would mean a higher pressure of 60–65 psia which in turn would require either a stronger weak liquor or a higher generator temperature at point E. This simplified system is, however, suitable for many absorption pairs besides 21-ETFE and for residential heating and cooling in areas where subfreezing temperatures are infrequently encountered.

An apparatus according to a third embodiment of the invention is illustrated in FIG. 3. In most respects it is identical to the first embodiment shown in FIG. 1. The first coolant pathway passes from its inlet 33 through the second pathway portion or coil 34 and then branches at the point labeled 38 at about 105° F. in the illustrative operation at 47° F. ambient temperature. A first branch passes through the major part of the condenser near point B which is at the condensing temperature of about 120° F. It returns through the third coil 35 where it is heated to about 135° and then through the reflux coil 36 and back to the eight-way valve 14. The second branch from the point labeled 38 passes through the hottest portion of the condenser 11 adjacent the refrigerant inlet 24. It will be appreciated that refrigerant coming from the refrigerant outlet 18 of the generator 10, and in particular from the vicinity of the reflux coil 36, will be at least about 150° F. By flowing in this second branch in countercurrent flow and heat exchange relation with the initially condensing refrigerant, the coolant in the second branch can heat up to about 130°–135° F. It then rejoins the first branch downstream from the reflux coil 36. This third embodiment is slightly more complex then the first embodiment but has the potential advantage of producing higher coolant temperatures from the condenser without raising the condensing temperature at point B. With the ETFE-21 absorption pair, this arrangement has been found to be particularly efficient.

The system may be connected several other ways. For example, the first coolant pathway can split adjacent the eight-way valve into a portion through the condenser and one or more portions through the absorber (in parallel) and rejoin into a single pathway through the reflux coil. Alternatively, with some absorption pairs, the first coolant pathway can pass in series through the condenser, the absorber and the reflux coil. Within the absorber, the first coolant pathway and the rich liquor pathway can both pass from the bottom (second or warm end) to the top (first or hot end) either in side-by-side coils, in inner and outer coils or in intertwined coils as shown in FIGS. 9 and 10 of my copending absorber unit application Ser. No. 796,493.

Other modifications, deletions and additions may be made in the preferred embodiments without departing from the scope of the invention which is set forth in the claims that follow.

I claim:

1. In a heat activated absorption heat pump apparatus having a generator, a condenser, an evaporator, an absorber, a first coolant pathway through the absorber and condenser, a second coolant pathway through the evaporator, a rich liquor pathway from the absorber to the generator, a weak liquor pathway from the generator to the absorber and a refrigerant vapor pathway from the generator to the condenser; the improvement which comprises the rich liquor pathway being located in heat exchange relation with a portion of the interior of the absorber, with the weak liquor pathway and with the refrigerant vapor pathway.

2. The apparatus of claim 1 further comprising an ambient air heat exchanger, a second heat exchanger in the vicinity of an area to be heated or cooled and means for selectively interconnecting the first and second coolant pathways with said ambient air heat exchanger and said second heat exchanger.

3. The apparatus of claim 1 wherein the absorber has a first end, a weak liquor inlet adjacent said first end, a second end, a rich liquor outlet adjacent the second end and an evaporated refrigerant inlet adjacent the second end, and the rich liquor pathway includes a first pathway portion in heat exchange relation with the interior of the absorber.

4. The apparatus of claim 3 wherein the first coolant pathway includes a second pathway portion in heat exchange relation with the interior of the absorber adjacent the second end and a third pathway portion in heat exchange relation with the interior of the absorber between the first pathway portion and the first end.

5. The apparatus of claim 4 wherein the first pathway portion is between the second and third pathway portions.

6. The apparatus of claim 5 wherein the rich liquor pathway includes a fourth pathway portion in heat exchange relation with the interior of the absorber, between the third pathway portion and the first end of the absorber.

7. The apparatus of claim 5 wherein the condenser has a first section and a second section and the first coolant pathway has a branch point between the second pathway portion and the condenser into a first branch through and in heat exchange relation with the second section of the condenser and communicating with the third pathway portion and a second branch through and in heat exchange relation with the first section of the condenser, the first section of the condenser being adjacent the inlet of said refrigerant vapor pathway into said condenser.

8. The apparatus of claim 1 wherein the first coolant pathway further comprises a reflux coil in heat exchange relation with said refrigerant vapor pathway.

9. The apparatus of claim 5 wherein the first coolant pathway further comprises a reflux coil communicating with the third pathway portion and which is located in heat exchange relation with the refrigerant vapor pathway.

10. In a method of absorption heating of the type wherein rich liquor containing a high concentration of refrigerant in absorbent is heated and separated into refrigerant vapor and a weak liquor containing a low concentration of refrigerant in absorbent, the refrigerant is condensed, the condensed refrigerant is evaporated, the evaporated refrigerant is absorbed in weak liquor to form rich liquor and a coolant is heated by heat exchange with the absorption of evaporated refrigerant into weak liquor and by heat exchange with the refrigerant vapor being condensed and is circulated to the vicinity of the space to be heated; the improvement comprising preheating the rich liquor by heat exchange with the evaporated refrigerant being absorbed in weak liquor, with refrigerant vapor and with weak liquor.

11. The method of claim 10 further comprising precooling condensed refrigerant by rejecting heat therefrom to evaporated refrigerant.

12. The method of claim 10 wherein the evaporated refrigerant is absorbed into weak liquor in a concentration gradient over a temperature gradient from a warm temperature to a hot temperature; and the coolant is heated first by the absorbing mixture at a first, warm temperature, then by the condensing refrigerant vapor and then by the absorbing mixture at a second, hot temperature.

13. The method of claim 12 wherein the rich liquor is preheated by the absorbing mixture at a third, warm temperature between the first, warm temperature and the second, hot temperature.

14. The method of claim 13 wherein the rich liquor is further preheated by the absorbing mixture at a fourth, hottest temperature.

15. The method of claim 10 wherein the refrigerant vapor is passed in heat exchange relation with the coolant to further heat the coolant and reflux the refrigerant vapor so as to remove absorbent vapor.

16. In a method of absorption refrigeration of the type wherein rich liquor containing a high concentration of refrigerant in absorbent is heated and separated into refrigerant vapor and a weak liquor containing a low concentration of refrigerant in absorbent, the refrigerant is condensed, the condensed refrigerant is evaporated, the evaporated refrigerant is absorbed in weak liquor to form rich liquor, a first coolant is heated by heat exchange with the absorption of evaporated refrigerant into weak liquor and by heat exchange with the refrigerant vapor being condensed and circulated to a heat well to release heat from the system and a second coolant is cooled by heat exchange with the condensed refrigerant being evaporated and circulated to the vicinity of the space to be cooled; the improvement which comprises heating the first coolant and rich liquor by heat exchange with evaporated refrigerant being absorbed into weak liquor and then further heating the rich liquor by heat exchange with refrigerant vapor and weak liquor.

17. In a heat activated absorption heat pump apparatus having a condenser, an evaporator, an absorber for absorbing refrigerant into an absorbent solution, a first coolant pathway through the absorber and condenser, a second coolant pathway through the evaporator and a generator having:

a boiler section, an analyzer section, a rectifier section, a refrigerant pathway from the boiler section through the analyzer section to a refrigerant outlet pathway in the rectifier section communicating with the condenser, a weak liquor pathway from the boiler section through the analyzer section to a weak liquor outlet pathway in the rectifier section communicating with the absorber and a rich liquor pathway from the absorber to the boiler section;

the improvement which comprises the rich liquor pathway passing, in sequence, through pumping means for increasing the pressure of the rich liquor, through the absorber in counterflow direction to the absorbing solution and in heat exchange relation with absorbing solution, through the rectifier portion of the generator in counterflow direction to and in heat exchange relation with the weak liquor outlet pathway and refrigerant outlet pathway and through the analyzer portion of the generator in heat and mass exchange relation with the refrigerant pathway and in heat exchange relation with the weak liquor pathway.

18. The apparatus of claim 17 wherein the rich liquor pathway is in counterflow relation with the absorbing solution in the absorber and in counterflow relation with the weak liquor and refrigerant pathways in the analyzer section of the generator.

19. The apparatus of claim 17 wherein the absorber has a first end with a weak liquor inlet communicating with weak liquor outlet of the generator, a second end with a refrigerant inlet communicating with the evaporator and an absorbing solution pathway from the first end to the second end, and wherein the rich liquor pathway and first coolant pathway each pass through portions of the absorber in paths toward the first end.

* * * * *